United States Patent [19]

Barwise et al.

[11] 4,053,004
[45] Oct. 11, 1977

[54] HELICAL HEAD COMMINUTING SHEAR

[75] Inventors: Robert D. Barwise, Bovey, Minn.; Rodger A. Arola, Hancock, Mich.; John R. Erickson, Alexandria, Va.

[73] Assignee: The United States of America as represented by the Secretary of Agriculture, Washington, D.C.

[21] Appl. No.: 576,757

[22] Filed: May 12, 1975

[51] Int. Cl.² .......................... B27C 1/08; B27L 7/00
[52] U.S. Cl. ........................... 144/162 R; 144/174; 144/193 D; 144/194; 83/672
[58] Field of Search ............... 144/43, 44, 162 R, 172, 144/174, 176, 194, 220, 221, 326 C, 193 A, 193 D-193 F; 241/81.1-82.7, 95, 101.4; 83/679, 658, 340, 672

[56] References Cited

U.S. PATENT DOCUMENTS

| 474,595 | 5/1892 | Ellrich | 241/82.2 |
|---|---|---|---|
| 908,348 | 12/1908 | Stenz | 241/82.3 |
| 959,714 | 5/1910 | Carlson | 241/82.2 |
| 1,815,829 | 7/1931 | Brown | 241/82.3 |
| 2,012,489 | 8/1935 | Walter | 83/340 X |
| 2,694,447 | 11/1954 | Hull | 83/340 |
| 2,951,519 | 9/1960 | Eriickson | 144/172 |
| 3,216,470 | 11/1965 | Nilsson | 144/172 X |
| 3,316,790 | 5/1967 | Frederiksen | 83/679 |
| 3,739,994 | 6/1973 | MacFarland | 241/82.3 X |

FOREIGN PATENT DOCUMENTS

| 186,391 | 10/1955 | Austria | 144/194 |
|---|---|---|---|
| 436,256 | 12/1948 | France | 241/82.5 |
| 1,120,159 | 7/1956 | France | 144/194 |
| 1,256,399 | 12/1967 | Germany | 144/162 R |

*Primary Examiner*—Gary L. Smith
*Attorney, Agent, or Firm*—M. Howard Silverstein; David G. McConnell

[57] ABSTRACT

A cutting machine to sever elongated wood particles or fiber masses to a predetermined length in one self-feeding and continuous operation. Said cutting machine reduces naturally formed and partially processed wood into particles of controlled length and cross-sectional dimension. A rotating spiral cutting edge mounted on a drive shaft is of varying radial length increasing from zero on one end to a radial length greater than the cross-sectional dimension of the wood or fiber to be sheared. In back of the shearing section a separate degradation spiral is situated that gradually decreases back to a minimal radial length on the other end. An anvil is provided over the length of the shearing section against which the rotating cutting edge shears the wood. In the back or degradation section, a casing in the shape of a truncated cone is fitted loosely around the decreasing spiral. Wood is fed parallel to the drive shaft into the front end of the apparatus. The rotating cutting edge contacts the log at regular intervals, thus severing wood particles of close length tolerance which are carried by the degradation spiral section and then pass through the degradation cone where, due to decreasing diameter and positive feed, cross-sectional area of said particles are reduced by longitudinal splitting and abrasion to permit passage through the outer end of the truncated cone.

12 Claims, 10 Drawing Figures

HELICAL HEAD COMMINUTING SHEAR

BACKGROUND OF THE INVENTION

1. Field of the Invention

This invention relates to the comminution of wood and more particularly to a spiral shear mechanism which, through its self-feeding characteristic, pulls wood through an apparatus while simultaneously severing particles of engineered length and cross-sectional area.

2. Description of the Prior Art.

Structural particleboard is expected to come into widespread use in the construction industry in the future. This product obtains its stiffness and stability from the long narrow flakes of minimal thickness of which it is comprised. Production of these long, thin flakes has presented problems since previous art could not provide controlled length particles needed for feed into flaking machines. Conventional wood chipping machines have been used to cut chips from logs which are then fed into a ring-type flaker to be cut to the proper thickness. Wood chippers are ordinarily used to produce relatively short, small chips for pulping processes. These short chips of which only 50-60 percent are to the length setting provided in the chipper do not produce the quality flake needed for structural strength board. The present invention can produce long wood pieces, or "fingerlings," of which 90-95 percent will be of sufficient length to be fed through flaker and then used for structural particleboard.

Presently a disk-type flaker is used which also can produce a high percentage of usable long particles. This flaker takes clean, round logs and cuts them into flakes of the desired size, thus eliminating the extra step necessary when using a ring-type flaker. The present invention, however, has many advantages over the disk flaker. The roundwood which the disk flaker requires as its raw material is not typical of the forest residue which is used for particleboard. The small, crooked material which is not suited for the disk flaker can be easily converted into fingerlings by the present invention. Furthermore, due to its small bulk and weight, the spiral cutter can be brought into the woods and operated at the forest residue collection site. This eliminates the problems involved in transporting bulky forest residue and prevents waste of the smaller branches which might otherwise be left at the site. Alternatively, this machine can reduce logging residue into pieces for dispersal over the forest floor with the benefit of rapid decay.

Another advantage over the prior art is that this invention provides positive control to cut fingerlings in the direction of the grain so that the resulting flakes will have the grain running lengthwise. This provides much greater strength than where the grain is cut cross-wise, which may result when a conventional chipper is used.

This invention can also be used to provide pulp chips of uniform length for papermaking. It is desirable that chips for this use be of very consistant dimensions. The reason for this is because chips of unequal size will cook at different rates in the pulping processes. As a consequence, when the wood chipper provides chips of varying sizes, the smaller chips will be overcooked reducing the quantity of usable fiber.

Normally this apparatus will be used to produce small particle of lengths between 1-inch and 6-inches, but it does have the capability of producing longer pieces of wood for such purposes as firewood. This is an advantage which no previous wood chipper can claim.

The helical shear cutter has fewer moving parts than wood chippers of the prior art and therefore lasts longer and requires less maintenance. When blade sharpening is necessary it is a simple operation because it may be done while the blade is mounted on the machine. Conventional chippers require removal of the blades for sharpening which can be a very costly procedure.

SUMMARY OF THE INVENTION

This invention is an improved cutting machine which reduces wood and other fibrous or nonfibrous material into particles of controlled length and near uniform cross-sectional area. A spiral cutting edge, or helical shear, is mounted on a drive shaft with the radial length of the helix, measured from the shaft, equal to zero at the front of the shaft progressing to a maximum length and then decreasing back to a minimal radial length at the back end of the shaft. The helix is divided into two separate functional sections. The first is a shearing section which is removably mounted to the shaft, and the second is the degradation section. The pitch of the helix preferably increases slightly up to the point of maximum radial length and then remains constant. An anvil is provided at the front or severing section against which the rotating helix shears or severs the woods into particles of engineered length. The clearance between the anvil and the helical shear is a maximum at the front end and decreases as the radial length of the helical shear increases. At the point where the helix is of maximum length the anvil is closely fitted so that the wood is completely severed at this point. A spout is provided adjacent to the front of the anvil to allow wood to be fed in parallel to the shaft.

An enclosure or casing is fitted around the decreasing degradation helix which is in the shape of a truncated cone. This casing, hereafter called a degradation cone, has one or more openings of measured cross-sectional area through which wood particles can pass. These openings preferably comprise slots along the length of the cone. A measured gap may also be provided between the shaft and the back or minor end of the degradation cone through which particles can also pass.

In some applications it is advantageous to include a conical casing fitted around the shearing section of the apparatus. On the other hand, a simplified apparatus comprised of only the shearing section with the anvil may be sufficient for some uses. This is particularly appropriate where perfectly uniform cross-sectional area is not necessary.

Accordingly, an object of the invention is to provide a cutter which can cut a long piece of wood or other material into particles of a uniform size. Another object is to provide a cutter which is simpler, smaller and lighter than the present art which is portable and can be operated at a logging site. A further object is a cutter with a blade that can be sharpened while on the machine. A final object is to develop a cutter which can cut fingerlings in the direction of the grain and thus provide particles from which uniform and stronger wood flakes can be made for structural particleboard. The apparatus has the desirable characteristic in that it is a self-feeding, uncomplicated feed mechanism.

DESCRIPTION OF THE PREFERRED EMBODIMENTS

Figure 1:
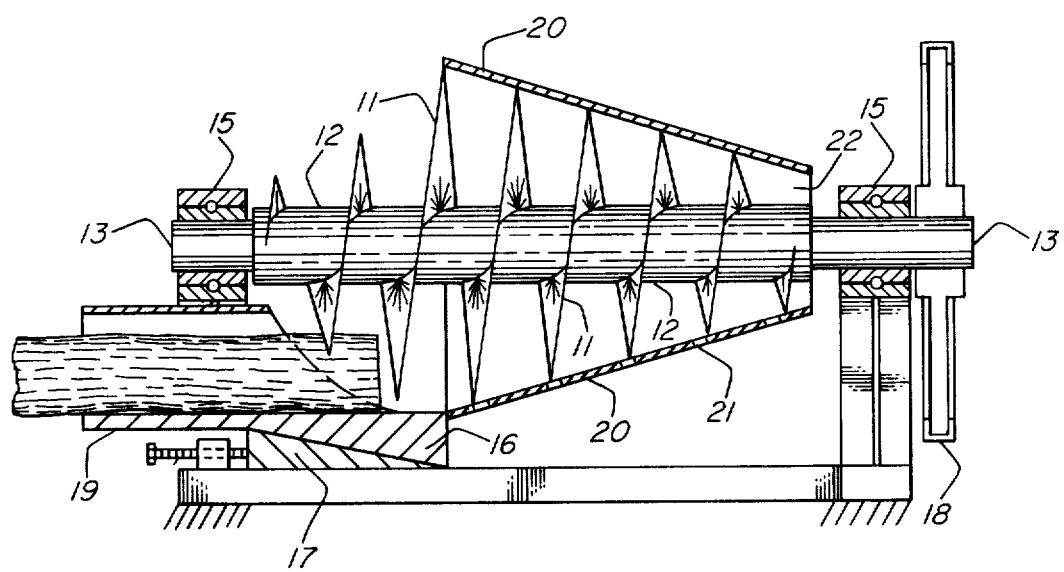
FIG. 1 is a fragmentary elevation view of subject invention.
Figure 2:
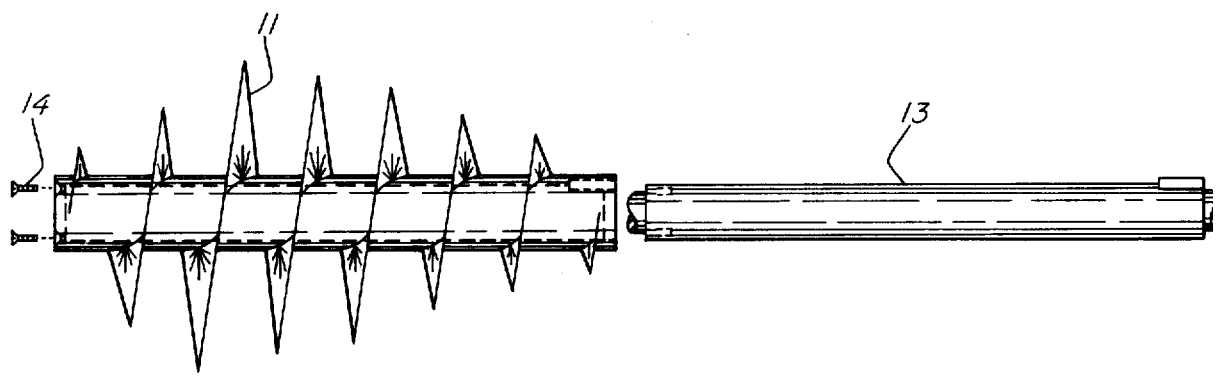
FIG. 2 is an elevation view showing the means by which the sleeve is attached to the shaft.

More specifically, referring to FIG. 1 the helical shear 11 is fixed to a sleeve 12 which is preferably mounted on the drive shaft 13 by means which allows it to be removed. The helix can therefore be replaced with helixes of different pitch so that the length of the end product may be varied. In the apparatus diagrammed in FIG.2 the torque load between the sleeve 12 and the shaft 13 is carried by a key. The sleeve is held longitudinally onto the shaft with two cap screws 14. The drive shaft 13 is rotatably mounted between bearings 15 with the front bearing being preferably removable to facilitate helix replacement. The anvil 16 mounted at the shearing section of the helix is preferably removable for the same reason. In the preferred embodiment the anvil 16 is positioned by means of a movable wedge 17 located under the anvil which enables the operator to adjust the position of the anvil as well as remove it for helix replacement. Close tolerance between the anvil and the point where the helix reaches maximum length is desirable to provide a clean cut of the wood. The shaft is powered by conventional variable speed drive 18.

Wood is fed through a spout 19, here cylindrical in shape, in a direction parallel to the shaft. The shearing action of the helix severs sections of the log into the desired length. Each pitch of the helix in contact tends to draw the log further into the helix thus accomplishing self-feeding. Some of these blocks will split longitudinally into smaller particles due to the compressive action of the edge. As these blocks and particles of controlled length are positively fed into the degradation cone 20 by the helix, they are further compressed between the shaft and the inner surface of the cone and abraded to specific width or depth dimensions by the decreasing diameter of the cone. These particles or fingerlings then exit the minor end of the cone or pass through the measured openings in the degradation cone. In the apparatus of FIG. 1 some of the particles that reach the desired dimensions pass through slots 21 located along the length of the degradation cone 20 while the remaining particles pass through the end opening 22 located between the back, or minor end, of the degradation cone and the sleeve. The diameter of this opening exceeds that of the sleeve by twice the thickness desired in the final particles. It is to be noted that with the exception of the initial shearing of the log, all of the breakage of the wood is in a longitudinal direction, parallel to the grain of the wood.

Figure 3:
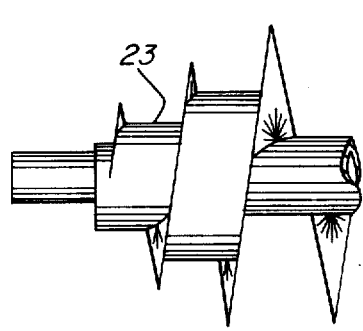
FIG. 3 is an elevation view showing a stepped sleeve.
Figure 4:
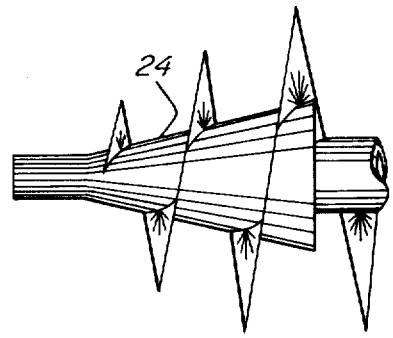
FIG. 4 is an elevation view showing a continuous cone sleeve.

To further facilitate breakage either a stepped sleeve 23 or a continuous cone sleeve 24, shown in FIGS 3 and 4 may be employed. This modification would affect only the shearing section of the apparatus.

Figure 5:
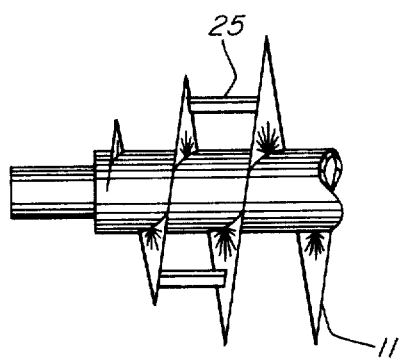
FIG. 5 is an elevation view showing the helix with wing-type cutters.

An alternative arrangement, diagrammed in FIG. 5, provides thin wing-type cutters 25 fixedly mounted transversely in the shearing section of the apparatus with ends fixed to adjacent flanks of the helix 11. The cutters 25 are positioned along the length of the helix at progressively increasing radial distances from the sleeve 12. Thus, as the cutting edge reaches a predetermined depth of cut, a wing-type cutter separates a wood particle of the depth no greater than the radial distance between the sleeve and the cutter. With each section of block cut from the log by the spiral shear, successive wing-type cutters remove particles equal in depth to the radial spacing of the preceding and suceeding cutter until the spiral shear has completed the cut through the entire log diameter.

Figure 6:
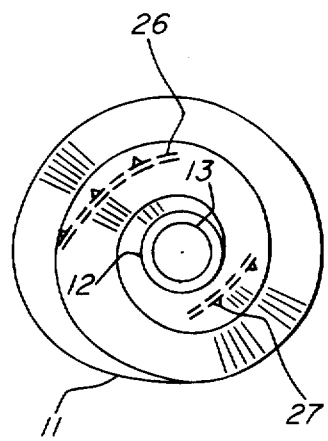
FIG. 6 is an end view of the helix with breaker ramps.
Figure 7:
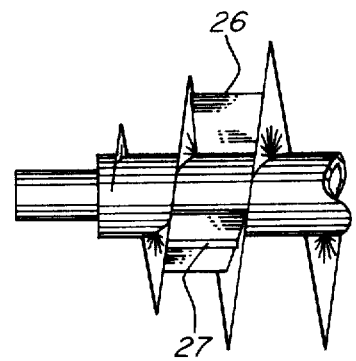
FIG. 7 is an elevation view of the helix with breaker ramps.

Another possible embodiment, shown in FIGS. 6 and 7, includes breaker ramps 26 which can also be transversely mounted between adjacent helix flanks. Each breaker ramp is comprised of a curved ramp with cleats 27 which progressively abrade and crush the severed block as the helix rotates.

It may be desirable to include a conical casing 28 closely fitted around the shearing section of the apparatus. The helix casing would thus appear as two truncated cones with their major ends joined. If the modified sleeve or breaker ramp arrangements were employed, this casing would provide a uniform surface against which the wood could be compressed.

Figure 8:
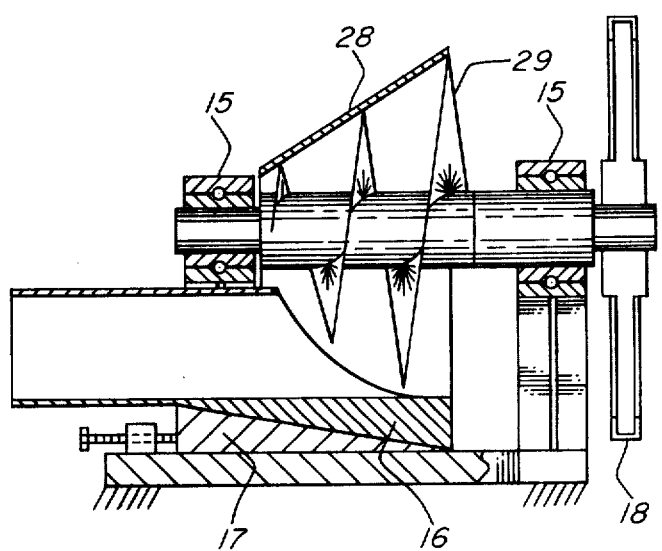
FIG. 8 is a fragmentary elevation view of the simplified apparatus comprised only of a shearing section.

A simplified apparatus comprised of only the shearing section of the apparatus may be sufficient for some applications. This is particularly appropriate where perfectly uniform cross-sectional area is not necessary. FIG. 8 shows the shearing helix 29 rotatably mounted between bearings 15 with the anvil 16 positioned thereunder. Conventional variable speed drive 18 is provided. This embodiment may, if desirable, include a modified sleeve, wing cutters or breaker ramps. A conical casing 28 may also be employed.

Figure 9:
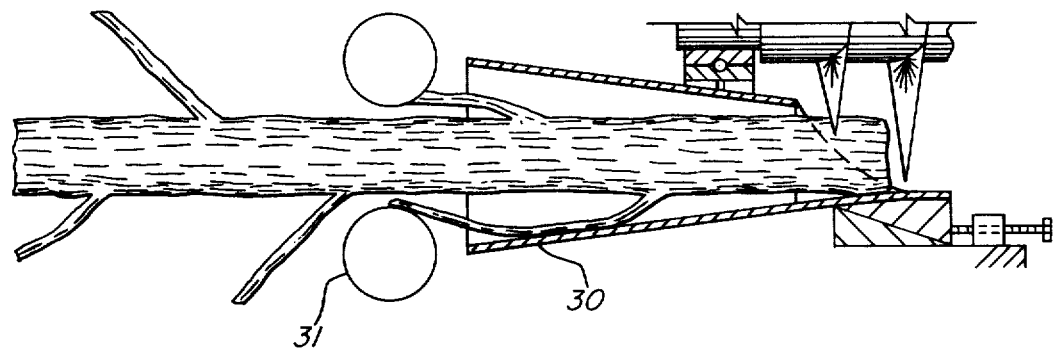
FIG. 9 is an elevation view showing an expending spout and rollers.

The apparatus diagrammed in FIG. 9 is fitted with an expanding spout 30 adjacent to the anvil 16. Compressive rollers 31 in multiples around the circumference of the spout may be used to crush the limbs to entrance dimension of the machine.

Figure 10:
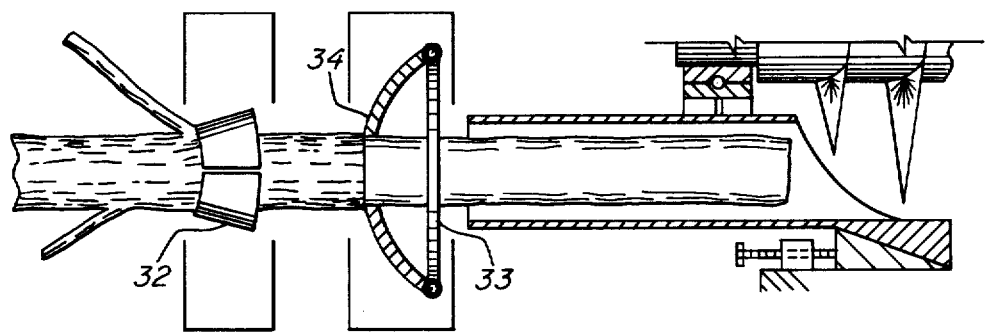
FIG. 10 is an elevation view showing the spout with auxiliary attachments.

Alternatively, shown in FIG. 10 is a simple limbing device comprised of blades 32 extending around the tree trunk. A debarking mechanism similar to a rosser or cambium shear barker may also be fitted between the limbing device and the spout of the apparatus. The cambium barker shown in FIG. 10 is comprised of a ring 33 with cutting arms 34 rotating rapidly around the tree, and a means of powering said barker. The positive linear force imparted by the rotating helix can provide adequate power to facilitate these preparatory operations. If desired, powered feed rolls can supplement the linear feed produced by the cutting action.

Having thus disclosed our invention, we claim:

1. A self-feeding cutting or shearing apparatus comprised of a helical blade mounted on a drive shaft, said blade having a cutting edge over the entire length of the helix and having a radial length of zero at the front end of said shaft progressing in a helix to a miximum radial length, each succeeding pitch being of at least equal distance or increasing the approximate thickness of the helical cutting blade, said shaft rotably mounted between bearings, an anvil mounted in close proximity at a point where the cutting helix is of maximum length and means to rotate said shaft.

2. The apparatus of claim 1 wherein the helix at the point of maximum radial length then decreases in a separate degradation section to a minimal radial length approaching zero, the pitch being constant but greater than the pitches of the shearing segment, around which a degradation cone is loosely fitted over the decreasing length of the degradation helix whereby wood fed into the shearing segment of the apparatus in a direction parallel to the shaft is severed into blocks of predetermined length then being positively fed by the degradation helix through the degradation section where they are broken longitudinally into smaller particles due to abrasion and compression between the shaft and the inner surface of the degradation cone, said particles then exit through the small end of the cone.

3. The apparatus of claim 2 whereas openings of measured cross-sectional areas along the length of the degradation cone allows wood particles of proper size to exit through said openings.

4. The apparatus of claim 1 wherein said severing helix is fixed to a sleeve which is provided with means to be removably attached to said shaft.

5. The apparatus of claim 4 with the addition of a conical casing closely fitted around the severing section.

6. The apparatus of claim 5 with the addition of wing-type cutters fixed transversely between adjacent helix flanks at specific radial distances from said shaft.

7. The apparatus of claim 5 with the addition of curved breaker ramps fixed between adjacent helix flanks whereby the wood pieces passing the ramp are additionally abraded and crushed between ramps and conical casing.

8. A cutting apparatus comprised of a helical blade mounted on a drive shaft, said blade having a radial length increasing from zero to a maximum and having an increasing pitch, said shaft rotatably mounted between bearings, an anvil mounted therebelow fitting closely at the point where the blade reaches a maximum radial length, and a means to rotate said shaft.

9. The apparatus of claim 8 wherein said severing helix is fixed to a sleeve which is provided with means to be fixed to and removed from said shaft.

10. The apparatus of claim 9 with the addition of thin wing-type cutters fixed transversely between adjacent helix flanks at specific radial distances from said shaft.

11. The apparatus of claim 9 with the addition of curved breaker ramps transversely fixed between adjacent helix flanks.

12. The apparatus of claim 11 with the addition of a conical casing closely fitted around said helix.

* * * * *